(12) United States Patent
Asoline et al.

(10) Patent No.: US 7,920,596 B2
(45) Date of Patent: Apr. 5, 2011

(54) METHOD FOR HIGH SPEED FRAMING AND A DEVICE HAVING FRAMING CAPABILITIES

(75) Inventors: Klod Asoline, Dimona (IL); Eran Glickman, Reshon Letzion (IL); Adi Katz, Ramat Gan (IL)

(73) Assignee: Freescale Semiconductor, Inc., Austin, TX (US)

( * ) Notice: Subject to any disclaimer, the term of this patent is extended or adjusted under 35 U.S.C. 154(b) by 452 days.

(21) Appl. No.: 12/160,007

(22) PCT Filed: Jan. 4, 2006

(86) PCT No.: PCT/IB2006/050028
§ 371 (c)(1),
(2), (4) Date: Jul. 3, 2008

(87) PCT Pub. No.: WO2007/077494
PCT Pub. Date: Jul. 12, 2007

(65) Prior Publication Data
US 2008/0313237 A1    Dec. 18, 2008

(51) Int. Cl.
*H04J 3/24* (2006.01)
(52) U.S. Cl. .................................. 370/474; 370/476
(58) Field of Classification Search ............ 370/476, 370/471, 474, 412
See application file for complete search history.

(56) References Cited

U.S. PATENT DOCUMENTS

| | | | |
|---|---|---|---|
| 5,671,223 A | 9/1997 | Shachar et al. | |
| 6,442,178 B1 | 8/2002 | Arato et al. | |
| 6,738,392 B1 * | 5/2004 | Thurston | 370/503 |
| 7,533,247 B2 * | 5/2009 | Jourdan et al. | 712/207 |
| 2002/0176449 A1 | 11/2002 | Trippe | |
| 2005/0053083 A1 | 3/2005 | O'Ceallaigh et al. | |
| 2005/0149602 A1 | 7/2005 | Venkatachalam et al. | |

FOREIGN PATENT DOCUMENTS

EP    132644 A2    2/1985

* cited by examiner

*Primary Examiner* — Brenda Pham

(57) ABSTRACT

A device having framing capabilities, the device includes at least one memory unit adapted to store data and metadata required for framing the stored data; the device is characterized by including a framer that is connected to a framed data unit and to a data fetch unit; wherein the device is adapted to select between a first operation sequence and a second operation sequence; wherein the first operation sequence comprises a data chunk and metadata fetch operation followed by a data chunk frame operation and wherein the second operation sequence comprises a multiple data chunk fetch operation followed by multiple data chunk frame operations; wherein the data fetch unit and the framer are adapted to execute the selected operation sequence. A method for framing data, the method includes storing data and metadata required for framing the stored data at one or more memory devices. The method is characterized by executing an operation sequence out of a first operation sequence and a second operation sequence; wherein the first operation sequence comprises a data chunk and metadata fetch operation followed by a data chunk frame operation and wherein the second operation sequence comprises a multiple data chunk fetch operation followed by multiple data chunk frame operations.

20 Claims, 5 Drawing Sheets

METHOD FOR HIGH SPEED FRAMING AND A DEVICE HAVING FRAMING CAPABILITIES

FIELD OF THE INVENTION

The invention relates to methods for high-speed framing and a device having framing capabilities, especially in telecommunication integrated circuits.

BACKGROUND OF THE INVENTION

Modern telecommunication devices are required to manage large amounts of communication channels. This management process includes processing information frames (or packets) according to one or more telecommunication protocols. Some of these stages are referred to as framing. Various framers are known in the art. U.S. Pat. No. 6,442,178 of Arato et al., titled "System and method for data alignment in a communication system" describes a prior art framer.

HDLC is a commonly used framing protocol. HDLC signals mark an end or beginning of a frame by an open or close frame flag that includes a sequence of six consecutive "1" bits. HDLC framers insert a zero bit after every sequence of five "1" bits of data in order to guarantee the identification of the end frame flag. Typically, framers are also capable of performing additional operations such as performing CRC error correction algorithms. The framing devices of this type can support multiple protocols that are based, but not necessarily so, on HDLC, such as Signaling system No 7, PPP, etc.

U.S. Pat. No. 5,671,223 of Shachar et al., titled "Multichannel HDLC framing/de-framing machine", which is incorporated herein by reference, provides an example of a prior art framer that uses metadata (such as control information, status information and the like) of various types in order to perform framing and de-framing operations. The metadata of a multi channel transmitter can include global (relevant to all channels) parameters, channel specific parameters, channel buffer descriptors and the like. Data can be stored in buffers that are pointed by pointers within buffer descriptors.

Modern communication devices are required to operate at ever growing rates. Various processing components such as framers are required to operate more quickly. One way of increasing the throughput of framers is to duplicate them, but this is a costly solution.

There is a need to provide efficient methods for performing framing operations and to provide efficient devices that have framing capabilities.

SUMMARY OF THE PRESENT INVENTION

A method for high-speed framing and a device having framing capabilities, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
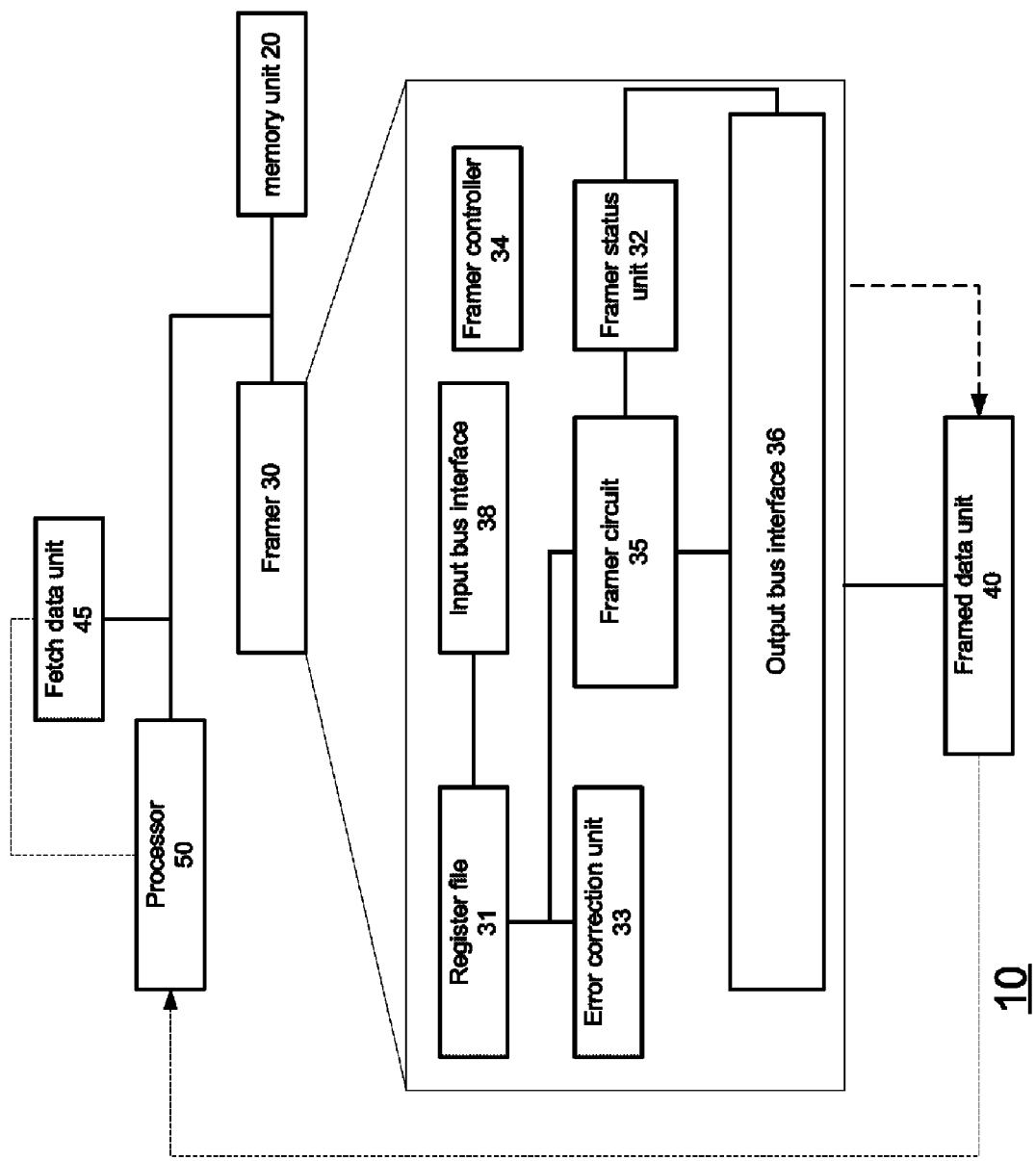
FIG. 1 illustrates a device according to an embodiment of the invention.

According to an embodiment of the invention a device having framing capabilities is provided. The device includes a framer that is adapted to frame a data chunk per data chunk frame operation.

The size of the data chunk is conveniently fixed. A typical data chunk frame operation is preceded by fetching data (one or more data chunks) as well as fetching metadata required for framing the data. The metadata can include masks, instructions, status and control information and the like. The metadata can include buffer descriptors. Usually, the aggregate size of metadata exceeds the size of the data chunk. Typically the data and metadata are fetched from a memory unit that can be an internal or an external memory unit.

A data chunk frame operation can include framing a data chunk to provide a framed data chunk. This operation can include applying error correction algorithms such as but not limited to the CRC algorithm. The inventors applied HDLC compliant framing operations but other framing mechanisms known in the art can be applied.

Conveniently, the device can speed the framing process by fetching multiple data chunks as well as fetching metadata required for framing the multiple data chunks. These fetching operations are followed by executing multiple data chunk frame operations.

Data chunks can be associated to other chunks. This association is reflected by an option to re-use in one data chunk frame operations the products of a previous data chunk-operation. For example, if two data chunks that belong to a certain communication channel are consecutively framed than at least a portion of the meta-data used during the framing of the first data chunk can be used for framing the second data chunk. One the other hand, consecutively framing data chunks that are not associated with each other will involve a repetition of a full scale meta-data retrieval sequence.

Conveniently, consecutively framing data chunks that are associated to each other can dramatically speed the framing process. For example, during consecutive framing operations a framer can use internally stored masks or status information relating to previous framing operations.

The inventors used a framer that was capable of framing one byte at a time. In order to frame this data byte thirty fetch and frame related instructions were executed. More than half of these instructions include fetch and/or write instructions. By consecutively framing associated data chunks fewer instructions were executed. The framing of the first byte involved executing thirty instructions while the framing of consecutive associated bytes required only ten instructions.

A single framer may be asked to frame data that is associated with multiple communication channels. In one mode of operation the device can repetitively perform a data and metadate fetch operation and then a data chunk frame operation. In another mode of operation the device can fetch (during one or more fetch operations) multiple data chunks and metadata required for framing the data chunks and then perform consecutive data chunk frame operations. After executing two or more data chunk frame operations the framer can output one or more framed data chunks simultaneously.

Conveniently, the device includes at least one memory unit that is adapted to store data and metadata required for framing the stored data and a framed data unit. The framed data unit can selectively receive framed data chunks from the framer. The framed data unit can include an internal memory, a multiplexer, a transmitter and the like. The frame data unit can be connected to other data frame transmitters such as physical layer or other lower layer data transmitters.

According to an embodiment of the invention the data chunk includes one or more bytes. The framed data chunks can be slightly larger, due to zero insertion operations or other protocol derived processing.

According to an embodiment of the invention the framed data unit can selectively ignore one or more framed data chunks that are provided during one or more data chunk frame operations. The framed data unit usually receives the framed data chunks later on. For example, it is assumed that the framer performs two consecutive data chunk frame operations. After the first data chunk frame operation the framer outputs a first framed data chunk. After the second data chunk frame operation the framer outputs concurrently the first framed data chunk and a second framed data chunk. This makes the invention compatible for metadata instruction containing multiple output commands placed in conditional branches and conditional jump commands.

The receiving Framed data unit is adapted to ignore the data chunks and provide the proper acknowledge.

The framed data unit can ignore the first framed data chunk that is provided after the first data chunk frame operation. This simplifies the management of framed data chunks and reduces the number of transactions between the framer and the framed data unit.

A method for framing data is provided. The method includes: (i) Storing data and metadata required for framing the stored data at one or more memory devices. The data can include multiple data chunks. (ii) Executing (560) an operation sequence out of a first operation sequence and a second operation sequence; wherein the first operation sequence comprises a data chunk and metadata fetch operation followed by a data chunk frame operation and wherein the second operation sequence comprises a multiple data chunk fetch operation followed by multiple data chunk frame operations.

Conveniently, a framer retrieves many instructions before starting to perform a framing operation. These multiple instructions form a framing code that can include multiple conditional branches. For example, a zero can be inserted after a sequence of five "1". The presence of such sequence is not known in advance, and a conditional branch to a routine that inserts a zero is required. Due to the complexity of the framing code merely applying the code multiple times can greatly simplify the code that is required for executing multiple data chunk frame operations.

For convenience of explanation the following detailed explanation will refer to data chunks that are one byte long and to a device that can either frame one byte and then frame another not-associated data chunk or can frame two associated bytes during two consecutive framing operations and then frame another pair of data chunks.

FIG. 1 illustrates a device 10 according to an embodiment of the invention. Device 10 includes a processor 50, a fetch data unit 45, a memory unit 20, a framer 30 and a framed data unit 40. The processor 50 is connected to the fetch data unit 45, to the framer 30 and to the memory unit 20 via a shared bus. The processor 50 is also connected to framed data unit 40.

The framed data unit 40 can include one or more interfaces, one or more memory units, one or more multiplexers, transmitters (such as but not limited to MAC layer transmitters, physical layer transmitters) and the like. The framed data unit 40 can also include various layer receivers. In such a case the framed data unit 40 can send framed data chunks to the framer and request the framer to de-frame the framed data chunks to provide data chunks (also referred to as raw data chunks). It is noted that the requests can be generated by another component.

The framed data unit 40 is adapted to receive framed data chunks from the framer 30. It can selectively ignore one or more data chunks, conveniently in response to control signals provided by framer 30.

Memory unit 20 can be connected to higher-level memory units via various buses, DMA controllers and the like. Data and metadata can be fetched from an external memory unit and just then fetched from memory unit 20, and vice verse. It is noted that the data can be stored in various buffers and that the metadata can include buffer descriptors, HDLS mask and status information and the like.

The framer 30 can fetch multiple data chunks as well as metadata required for framing the data chunks, performs a sequence of data chunk frame operations and provides multiple frame data chunks to the frame data chunk unit 40.

The framer 30 can operate in a single byte framing mode or in a double byte operational mode. The framer 30 outputs a control signal (valid output flag) that indicates if the framed data unit 40 should accept the framed data unit that is outputted from the framer 30 or should it be ignored.

For example, assuming that the framer 30 is requested to consecutively frame two associated data chunks. The framer 30 performs a first data chunk frame operation and generates a first framed data chunk. This first framed data chunk is stored at the framer 30. The framer also resets a valid output flag and in response the framed data unit 40 ignores the first framed data chunk. The framed data unit 40 will not initiate a transaction to receive the first framed data chunk and will not store it.

The framer 30 then frames the second data chunk, while using various parameters that were fetched and even optionally updated during the first data chunk framing operation as well as using the framed data chunk. This dramatically speeds the second data chunk frame operation and does not require a change in the code handling a single byte or more then a single byte. The framer also sets the valid output flag and outputs (in parallel or in a serial manner) the first and second framed data chunks to the framed data unit 40. The framed data unit 40 receives both framed data chunks and can store them, further process them, multiplex them, and the like.

When the framer 30 operates at a single byte mode the valid output flag is usually set, unless some error occurred.

It is noted that the framer 30 can also output a single framed data chunk per framing operation and that the framed data unit 40 can receive each framed data chunk. The output valid flag is irrelevant in such a scenario.

The framer 30 includes a register file 31, an input bus interface 38, a framer controller unit 34, an error correction unit 33, a framer circuit 35, a framer status indictor 32 and an output bus interface 36.

The register file 31 is connected to the error correction unit 33, the framer circuit 35 to the input bus interface 36 and to the output but interface 36. The register file 31 can store one or more data chunks and metadata required for framing one or more data chunks. It conveniently receives data and metadata via input bus interface 38 and outputs one or more framed data chunks to the output bus interface 36.

The framer circuit 35 and the error correction unit 33 are adapted to process a data chunk according to metadata associated with the data chunk. The framer circuit 35 outputs framed data chunks to the output bus interface 36.

The framer controller 34 controls the operation of various components of framer 30 and can, for example, determine from which entries to fetch data and metadata. The framer controller 34 may include an address generator unit and a bus transaction unit. Each of the interfaces 38 and 36 can include one or more buffers. The framer controller 34 can set or reset various flags (such as valid output flag) that are stored at framer status unit 32.

Figure 2:
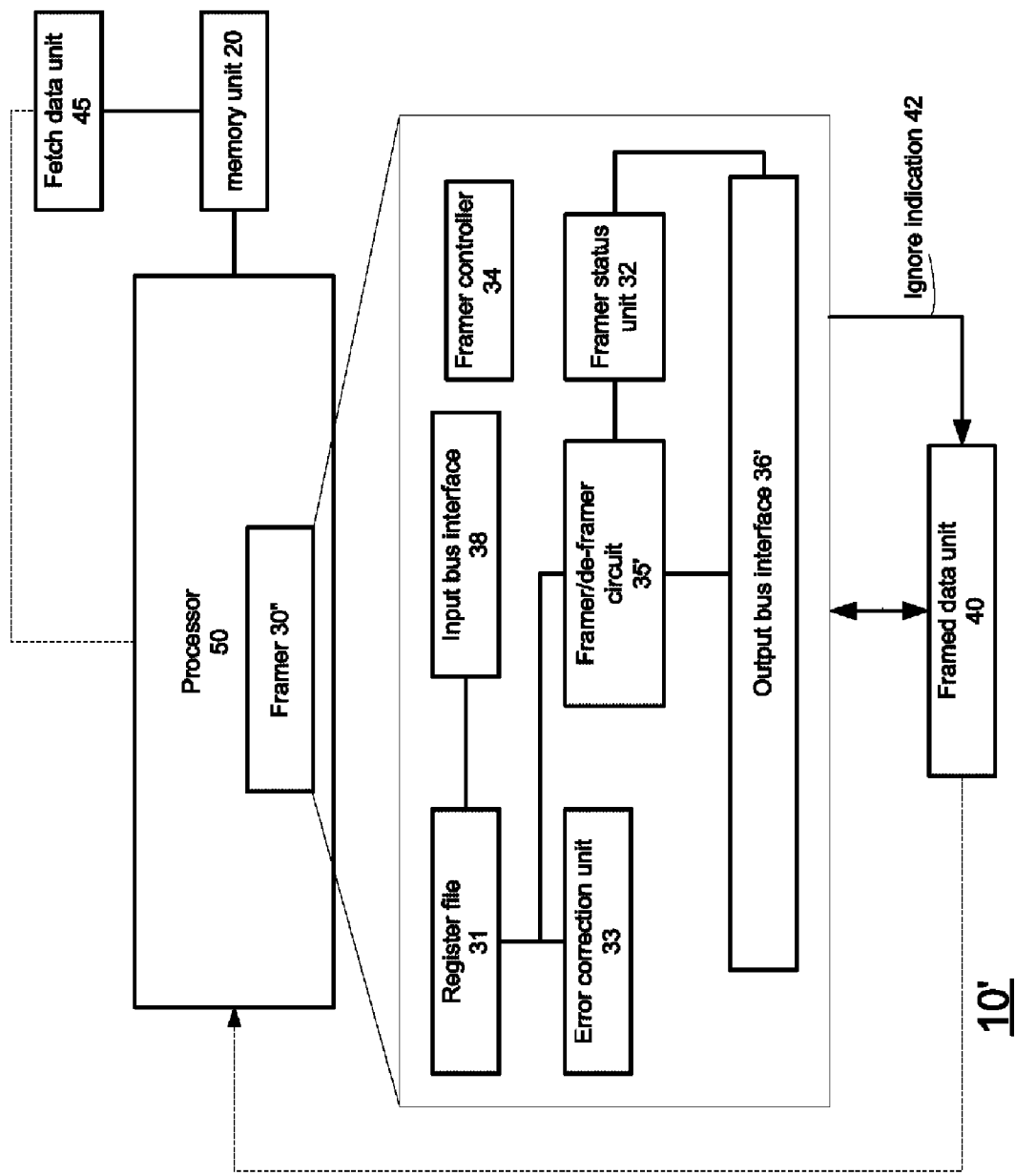
FIG. 2 illustrates a device according to another embodiment of the invention.

FIG. 2 illustrates device 10' according to another embodiment of the invention.

Device 10' of FIG. 2 differs from device 10 of FIG. 1 by: (i) having a framer 30'' that is also adapted to perform de-framing operations, and (ii) having a processor 50 that includes framer 30.

Framer 30'' differs from framer 30 by including a framer/de-framer circuit 35'. In addition, the error correction unit 33' should perform error correction operations and reverse error correction stages. For example in one phase it generates a CRC codeword and in another phase it uses a received CRC codeword to correct errors in the received framed data chunk. Conveniently, the stream of data is reversed during reception operation while the stream of metadata flows at the same direction.

Figure 3:
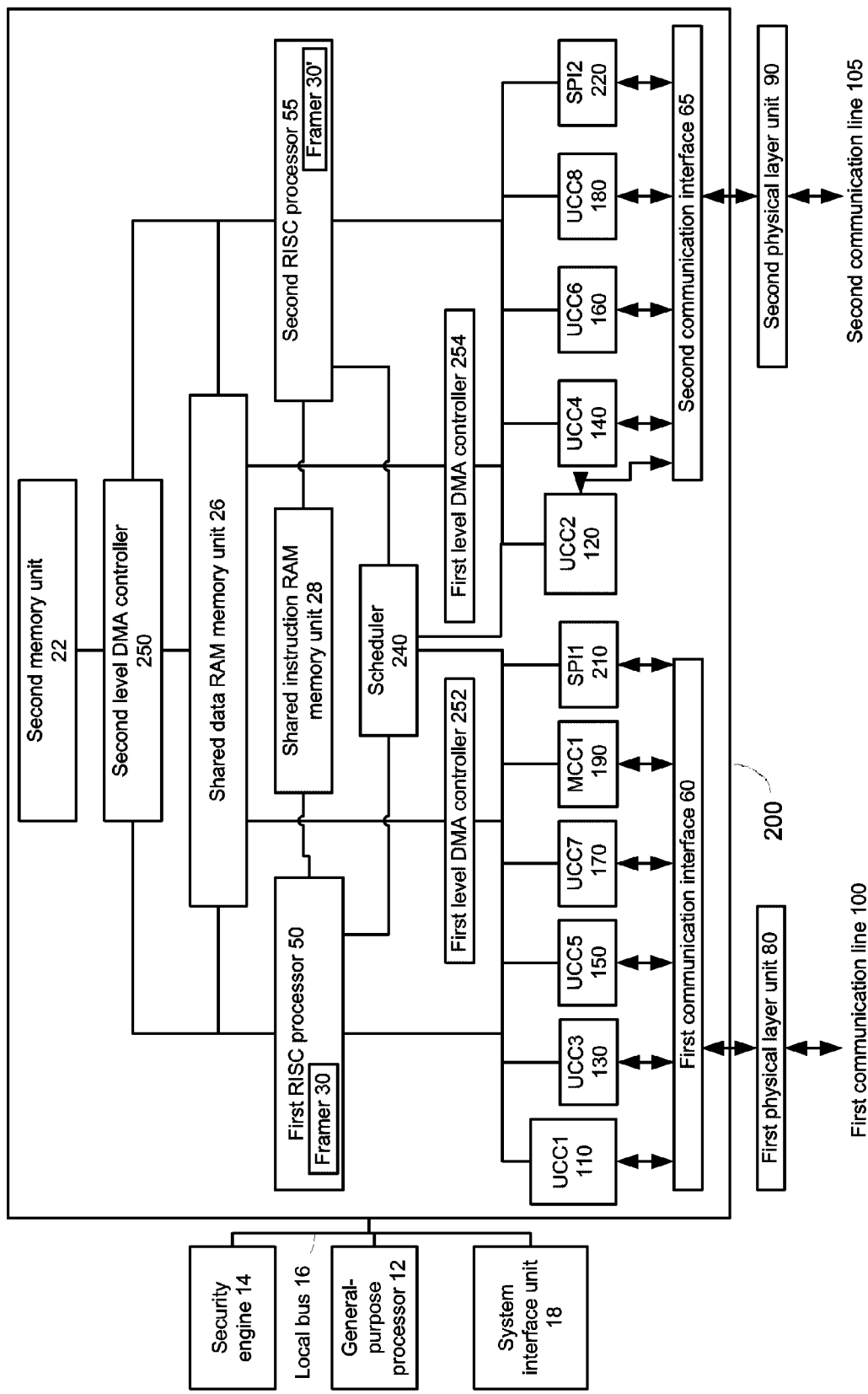
FIG. 3 illustrates a device according to a further embodiment of the invention.

FIG. 3 illustrates a device 10'', according to an embodiment of the invention.

Device 10'' includes a general-purpose processor 12, a security engine 14, system interface unit 18, communication engine 200 and multiple ports (not shown). Components 12, 14, 18 and 200 are connected to each other by local bus 16.

The general-purpose processor 12 can include multiple execution units such as but not limited to an integer unit, a branch processing unit, a floating point unit, a load/store unit and a system register unit. It can also include various cache memories, dynamic power management unit, translation look aside buffers, and the like.

The general-purpose processor 12 controls device 10'' and can execute various programs according to the required functionality of device 10''. The general-purpose processor 12 can be a member of the PowerPC™ family but this is not necessarily so.

The security engine 14 can apply various security mechanisms including encryption based mechanisms and the like.

Device 10'' can be connected to multiple memory units as well as other components. These components are interfaced by system interface unit 18. System interface unit 18 may include some of the following components: external memory controllers, external DDR interface unit, PCI bridge, local bus, bus arbitrator, dual UART unit, dual I²C unit, a four channel DMA controller, an interrupt controller, and the like. It is noted that other interfacing components can be used.

Communication engine 200 is a versatile communication component that can manage multiple communication ports that operate according to different communication protocols.

Communication engine 200 includes multiple communication controllers of different types. Each communication controller can manage one or more communication channels. Conveniently, each communication channel is associated with a single virtual buffer. A bi-directional communication channel is viewed as a combination of a receive communication channel and a transmit communication channel. Each such communication channel can have its own information transfer controller, virtual buffers, hardware Buffer, and the like.

It is noted that one or more communication channels can be controlled by a single information transfer controller, but this is not necessarily so.

The communication engine 200 includes two RISC processors 50 and 55, second level DMA controller 250, a shared data RAM memory unit 26, a shared instruction RAM memory unit 28, scheduler 240, two first level DMA controllers 252 and 254, a second memory unit 22, eight universal communication controllers denoted UCC1-UCC8 110-180, one multi-channel communication controller (MCC1) 190, two serial peripheral interfaces denoted SP1-SP2 210-220, and two communication interfaces 60 and 65. It is noted that additional components, such as but not limited to various ports, time slots assigners and the like were omitted for simplicity of explanation.

The first RISC processor 50 is connected to UCC1 110, UCC3 130, UCC5 150, UCC7 170, MCC1 190, SPI1 210, scheduler 240, shared instruction RAM memory unit 28 and shared data RAM memory unit 260. The access to the first RISC controller can be managed by scheduler 240.

The second RISC processor 55 is connected to UCC2 120, UCC4 140, UCC6 160, UCC8 180, SPI2 220, scheduler 240, shared instruction RAM memory unit 25 and shared data RAM memory unit 26. The access to the first RISC controller can be managed by scheduler 240.

The first level DMA controllers 252 and 254 are connected to the shared data RAM memory unit 26 and to information transfer controllers (not shown) within the various communication controllers.

Each communication controller out of communication controllers UCC1-UCC8 110-180, MCC1 190, and SPI1-SPI2 210-220 can include transmission paths as well as reception paths.

Conveniently, a UCC can support the following communication protocols and interfaces (not all simultaneously): 10/100 Mbps Ethernet, 1000 Mpbs Ethernet, IPv4 and IPv6, L2 Ethernet switching using, ATM protocol via UTOPIA interface, various types of HDLC, UART, and BISYNC.

Conveniently, MCC1 190 supports two hundred and fifty six HDLC or transparent channels, one hundred and twenty eight SS#7 channels or multiple channels that can be multiplexed to one or more TDM interfaces.

In addition, the communication engine 200 can include a controller (not shown) as well as an interrupt unit that coordinate the various components of the communication engine, as well as to enable the communication engine 200 to communicate with general-purpose processor 12, security engine 14 and system interface unit 16.

Conveniently, a group of communication controllers are connected to a single first level DMA controller, but this is not necessarily so. For example, first level DMA controller 310 serves communication controllers UCC1, UCC3, UCC5, UCC7, MCC1 and SPI1 110, 130, 150, 170, 190 and 210 respectively, while first level DMA controller 252 serves communication controllers UCC2, UCC4, UCC6, UCC8 and SPI2 120, 140, 160, 180 and 220 respectively.

Communication engine 200 can include multiple components that are analogues to the components of FIG. 1 or FIG. 2. It is assumed that each RISC processor (out of 50 and 55) includes a framer such as framer 30 of FIG. 1 or framer 30' of FIG. 2. For example, first RISC processor 30 includes framer 30 while second RISC processor 55 includes framer 30' that is analogues to framer 30. Memory unit 20 of FIG. 1 can includes shared data memory RAM 26 and shared instruction RAM memory unit 28. Metadata can be stored in both of these memory units. The fetch data unit 45 of FIG. 1 can be an internal component of each of the RISC processors 50 and 55 or can be a full scale DMA controller. The framed data unit 40 can include any of the multiple communication controllers UCC1-UCC8, MCC 190 an as well as first and second communication interfaces 60 and 65 and even include first and second physical layer units 80 and 90.

The framed data unit 40 sends requests to receive framed data chunks (during a transmission phase) or to receive framed data chunks (during a reception phase).

Figure 4:
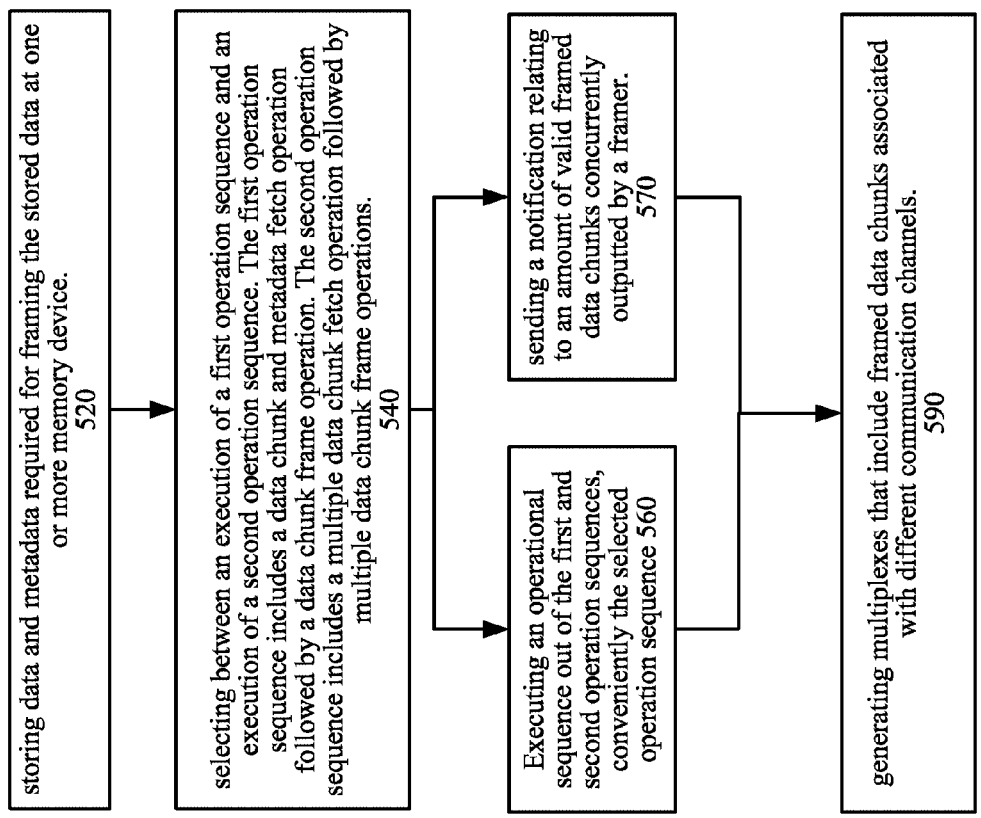
FIG. 4 is a flow chart of a method for framing data according to an embodiment of the invention.

FIG. 4 illustrates a flow chart of method 500, according to an embodiment of the invention.

Method 500 starts by stage 520 of storing data and metadata required for framing the stored data at one or more memory device. Referring to the example set forth in FIG. 5, data and metadata are provided to shared data RAM memory unit 26 and to shared instruction RAM/ROM memory unit 28. This stage can involve executing one or more fetch operations from the second memory unit 22, by the second level DMA controller 250.

Stage 520 is followed by stage 540 of selecting between an execution of a first operation sequence and an execution of a second operation sequence. The first operation sequence includes a data chunk and metadata fetch operation followed by a data chunk frame operation. The second operation sequence includes a multiple data chunk fetch operation followed by multiple data chunk frame operations.

According to an embodiment of the invention the selection is responsive to a predefined value of a certain control signal or a certain field within a memory unit. The selection can be made in advance to the framing process, by a programmer or by a user that can enter a selection parameter. Conveniently, the amount of consecutive data chunk frame operation can also be provided. It is noted that stage 540 can precede stage 520. It is also noted that method 500 can alternatively include receiving a selection indication and in response jumping to stage 560 of performing the selected operation.

Stage 540 is followed by stage 560 of executing an operation sequence out of the first operation sequence and a second operation sequence. The execution is conveniently responsive to selection made in stage 540.

Conveniently, stage 560 includes executing at least one data chunk frame operation by a framer that is adapted to frame a single data chunk per one data chunk frame operation. Thus, framing multiple data chunks requires a sequence of data chunk frame operations.

Conveniently an execution of the second operation sequence includes generating multiple framed data chunks during the multiple data chunk frame operations and ignoring at least one of the multiple framed data chunks.

According to an embodiment of the invention the second operation sequence includes two data chunk frame operations.

Conveniently, the second operation sequence includes two data chunk frame operations; and wherein the executing includes requesting to ignore a single data chunk that is outputted after a certain data chunk frame operation and requesting to receive a pair of data chunks that are outputted after a consecutive data chunk frame operation.

Conveniently, stage 560 includes temporarily storing one or more framed data chunks. These framed data chunks can be stored at the framer. This storage can allow to concurrently output multiple framed data chunks to the framed data unit, thus reducing the number of transactions between the framer and the framed data chunk unit. It is noted that the stored frame data chunks can be erased after they are accepted by the framed data unit.

Conveniently, method 500 further includes stage 570 of sending a notification relating to an amount of valid framed data chunks concurrently outputted by a framer.

Stages 560 and 570 are followed by stage 590 of repetitively generating multiplexes that include framed data chunks associated with different communication channels. A single multiplex can include fewer data chunks (or one data chunks) than the number of data chunks that are outputted by a framer, thus the excessive framed data chunks can be temporarily stored. Conveniently, method 500 includes concurrently outputting framed data chunks that belong to multiple multiplexes. The second operation sequence is a fraction of the first operation sequence and replaces it in the second operation. In the first operation sequence the framed data unit will ignore any transaction from the framer allowing the use of the same code, conditional branches and conditional jumps as the first operation sequence.

Figure 5:
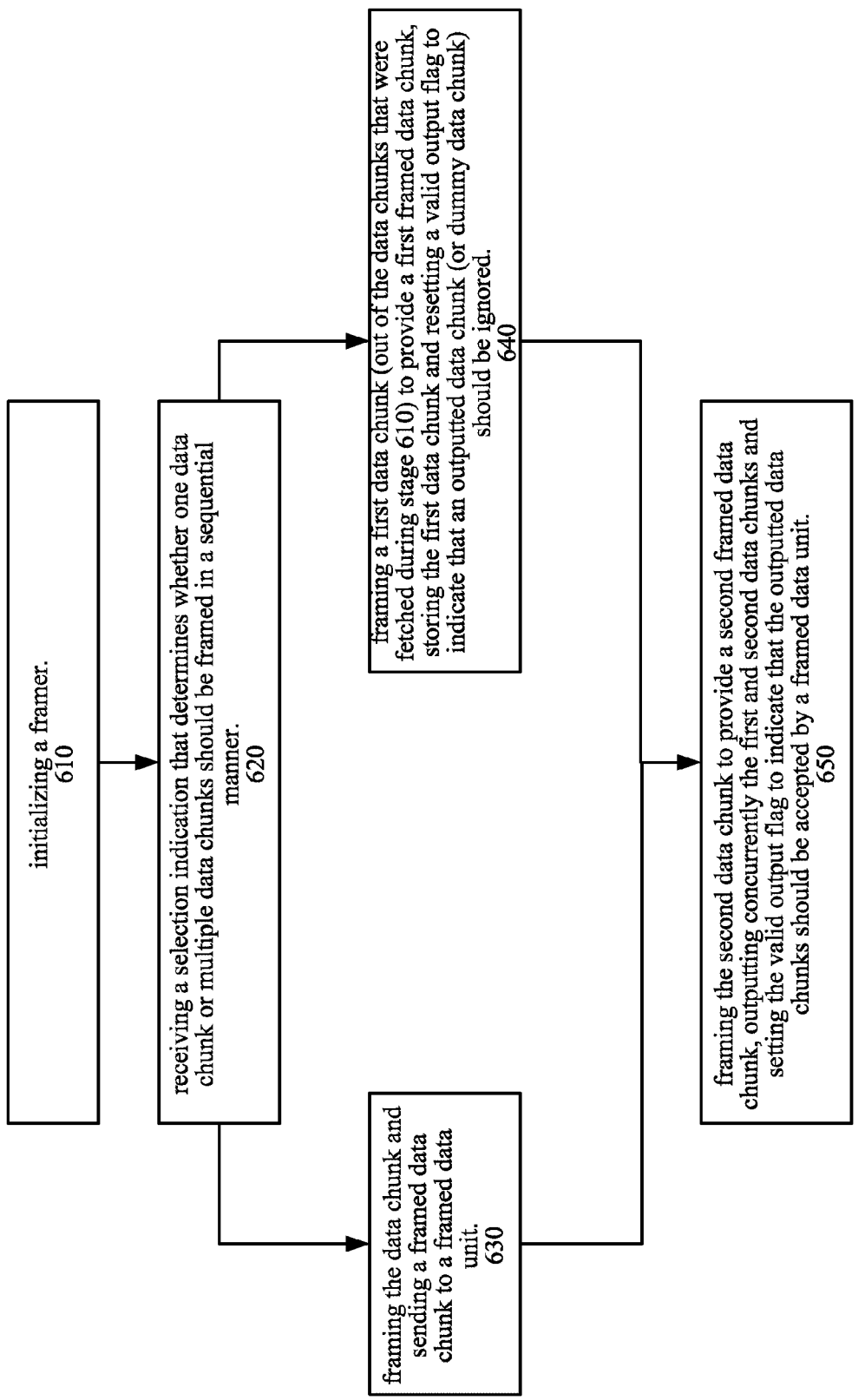
FIG. 5 illustrates an operation sequence according to an embodiment of the invention.

FIG. 5 illustrates an operation sequence 600 according to an embodiment of the invention.

Operation sequence 600 starts by stage 610 of initializing a framer. The initialization can involve fetching one or more data chunks and metadata required to the framing of the one or more data-chunks. Conveniently, the data chunk is one byte long and up to two data chunks can be fetched during stage 610.

Stage 610 is followed by stage 620 of receiving a selection indication that determines whether one data chunk or multiple data chunks should be framed in a sequential manner. If one data chunk is to be framed then stage 620 is followed by stage 630 of framing the data chunk and sending a framed data chunk to a framed data unit.

If multiple (such as two) data chunks should be framed then stage 620 is followed by stage 640 of framing a first data chunk (out of the data chunks that were fetched during stage 610) to provide a first framed data chunk, storing the first data chunk and resetting a valid output flag to indicate that an outputted data chunk (or dummy data chunk) should be ignored. The framed data unit will ignore the operation, provide all relevant acknowledges or hand-shake signals and clearing the ignore indication as preparation to the next write.

Stage 640 is followed by stage 650 of framing the second data chunk to provide a second framed data chunk, outputting concurrently the first and second data chunks and setting the valid output flag to indicate that the outputted data chunks should be accepted by a framed data unit.

Stages 650 and 630 can be followed by stage 610. It is noted that once stage 630 and 650 end one or more data chunks that can be associated with another communication channel can be framed.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A device having framing capabilities, the device comprises:
    at least one memory unit configured to store data and metadata required for framing the stored data;
    the device is characterized by comprising a framer coupled to a framed data unit and to a data fetch unit;
    wherein the device is configured to execute a first operation sequence and a second operation sequence;
    wherein the first operation sequence comprises a data chunk and metadata fetch operation followed by a data chunk frame operation; and
    wherein the second operation sequence comprises a multiple data chunk fetch operation followed by multiple data chunk frame operations;

wherein the data fetch unit and the framer are configured to execute a selected one of a group comprising the first operation sequence and the second operation sequence.

2. The device according to claim 1 wherein the framer is adapted to output multiple framed data chunks during the multiple data chunk frame operation and wherein the framed data unit is configured to ignore at least one of these framed data chunks.

3. The device according to claim 1 wherein the framer is notify the framed data unit an amount of data chunks it concurrently outputs.

4. The device according to claim 1 wherein the framer is configured to output one framed data chunk or two framed data chunks concurrently.

5. The device according to claim 4 wherein the framer comprises a framer status unit configured to request the framed data unit to ignore a single data chunk that is outputted after certain data chunk frame operation and to receive pairs of data chunks that are outputted after a consecutive data chunk frame operation.

6. The device according to claim 1 wherein the framer includes a framed data chunk buffer for temporarily storing one or more framed data chunks.

7. The device according to claim 6 wherein the framer is configured to erase a stored framed data chunk after the stored framed data chunk is accepted by the framed data unit.

8. The device according to claim 1 wherein the framed data unit is configured to generate multiplexes that comprise framed data chunks associated with different communication channels and wherein the framer is adapted to concurrently output framed data chunks that belong to multiple multiplexes.

9. The device according to claim 1 wherein the device includes multiple framers, wherein each framer is included within a RISC processor.

10. The device according to claim 1 wherein the framer is configured to perform error correction operations.

11. A method for framing data, the method comprises:
storing data and metadata required for framing the stored data;
selecting between a first operation sequence and a second operation sequence;
executing the selected operation sequence of the first operation sequence and the second operation sequence;
wherein the first operation sequence comprises a data chunk and metadata fetch operation followed by a data chunk frame operation and wherein the second operation sequence comprises a multiple data chunk fetch operation followed by multiple data chunk frame operations.

12. The method according to claim 11 wherein the executing of the second operation sequence comprises generating multiple framed data chunks during the multiple data chunk frame operations and ignoring at least one of the multiple framed data chunks.

13. The method according to claim 11 wherein the method further comprises sending a notification relating to an amount of valid framed data chunks concurrently outputted by a framer.

14. The method according to claim 11 wherein the second operation sequence comprises two data chunk frame operations.

15. The method according to claim 14 wherein the second operation sequence comprises two data chunk frame operations; and wherein the executing comprises requesting to ignore a single data chunk that is outputted after a certain data chunk frame operation and requesting to receive a pair of data chunks that are outputted after a consecutive data chunk frame operation.

16. The method according to claim 11 wherein the executing comprises temporarily storing one or more framed data chunks.

17. The method according to claim 16 wherein the executing comprises erasing a stored framed data chunk after the stored framed data chunk is accepted by a framed data unit.

18. The method according to claim 11 wherein the executing is followed by repetitively generating multiplexes that comprise framed data chunks associated with different communication channels and wherein the executing comprises concurrently outputting framed data chunks that belong to multiple multiplexes.

19. The method according to claim 11 wherein the framer is configured to perform error correction operations.

20. The method according to claim 11 wherein the executing comprises executing at least one data chunk frame operation by a framer that is configured to frame a single data chunk per one data chunk frame operation.

* * * * *

UNITED STATES PATENT AND TRADEMARK OFFICE
CERTIFICATE OF CORRECTION

| | | |
|---|---|---|
| PATENT NO. | : 7,920,596 B2 | Page 1 of 1 |
| APPLICATION NO. | : 12/160007 | |
| DATED | : April 5, 2011 | |
| INVENTOR(S) | : Klod Asoline et al. | |

It is certified that error appears in the above-identified patent and that said Letters Patent is hereby corrected as shown below:

Column 9, Line 5, please change "adapted" to --configured--

Signed and Sealed this
Eighteenth Day of October, 2011

David J. Kappos
*Director of the United States Patent and Trademark Office*